United States Patent
Noda et al.

(10) Patent No.: US 12,345,994 B2
(45) Date of Patent: Jul. 1, 2025

(54) ELECTROPHORESIS DEVICE

(71) Applicant: HITACHI HIGH-TECH CORPORATION, Tokyo (JP)

(72) Inventors: Kazuki Noda, Tokyo (JP); Katsuhiro Aritome, Tokyo (JP); Takeshi Ooura, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 515 days.

(21) Appl. No.: 17/759,910

(22) PCT Filed: Feb. 21, 2020

(86) PCT No.: PCT/JP2020/006990
§ 371 (c)(1),
(2) Date: Aug. 1, 2022

(87) PCT Pub. No.: WO2021/166210
PCT Pub. Date: Aug. 26, 2021

(65) Prior Publication Data
US 2023/0121178 A1    Apr. 20, 2023

(51) Int. Cl.
*G01N 27/447* (2006.01)
*G02F 1/167* (2019.01)
(Continued)

(52) U.S. Cl.
CPC ............ *G02F 1/167* (2013.01); *G02F 1/1676* (2019.01); *G02F 1/1679* (2019.01); *G02F 1/1685* (2019.01)

(58) Field of Classification Search
CPC .... G01N 27/26; G01N 27/416; G01N 27/447; G01N 27/44704; G01N 27/44713;
(Continued)

(56) References Cited

U.S. PATENT DOCUMENTS

2004/0018638 A1   1/2004   Shoji et al.
2007/0175757 A1   8/2007   Hanafusa et al.
2012/0037508 A1   2/2012   Shiraki et al.

FOREIGN PATENT DOCUMENTS

JP         60-119457 A     6/1985
JP       2003-344356 A    12/2003
(Continued)

OTHER PUBLICATIONS

International Search Report, mailed Apr. 28, 2020, for International Application No. PCT/JP2020/006990.

*Primary Examiner* — Gurpreet Kaur
(74) *Attorney, Agent, or Firm* — Baker Botts L.L.P.

(57) ABSTRACT

The present invention provides an electrophoresis device with improved abnormality detection capability. The electrophoresis device according to the present invention includes a flow passage with which a phoresis medium is filled, a first and second electrodes disposed at respectively a cathode side and an anode side of the flow passage, a power supply for applying voltage across the first and second electrodes, a pump for feeding the phoresis medium to the flow passage, and a control section. The control section executes operations including filling the flow passage with the phoresis medium, executing electrophoresis of a sample, and applying voltage to the first and second electrodes prior to the sample electrophoresis to determine a state of a current path based on a value of current flowing through the current path. The control section applies voltage to the current path for 20 seconds or longer in the determine step.

10 Claims, 5 Drawing Sheets

(51) Int. Cl.
*G02F 1/1676* (2019.01)
*G02F 1/1679* (2019.01)
*G02F 1/1685* (2019.01)

(58) Field of Classification Search
CPC ........ G01N 27/44743; G01N 27/44791; G02F 1/167; G02F 1/676
See application file for complete search history.

(56) References Cited

FOREIGN PATENT DOCUMENTS

| | | |
|---|---|---|
| JP | 2007-107915 A | 4/2007 |
| JP | 2012-068234 A | 4/2012 |
| JP | 2012-093352 A | 5/2012 |

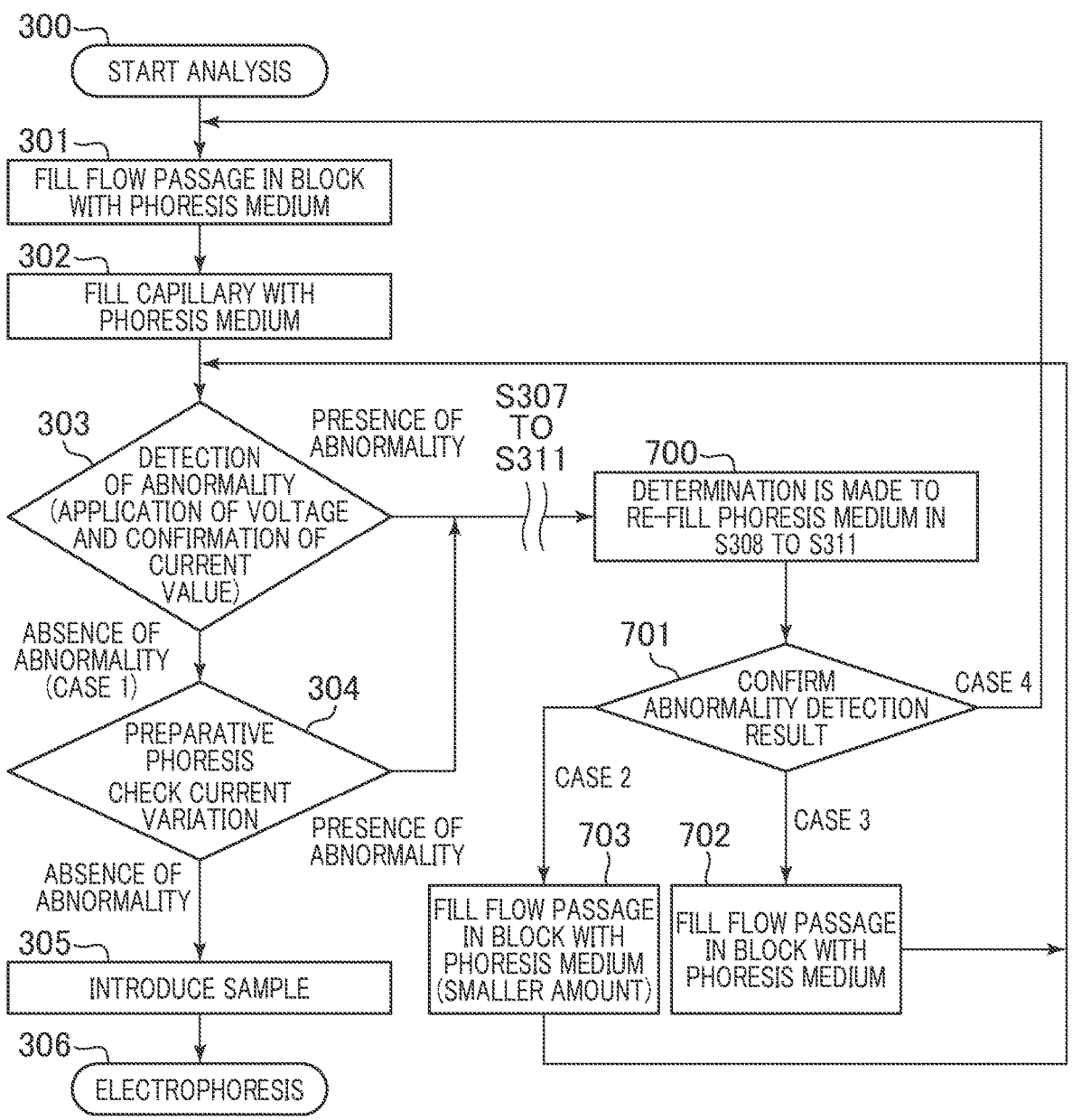

ELECTROPHORESIS DEVICE

TECHNICAL FIELD

The present invention relates to an electrophoresis device, specifically, detection of abnormality in a flow passage.

BACKGROUND ART

A capillary electrophoresis device has been widespread as the technique for separation analysis of many kinds of biological samples such as deoxyribonucleic acid (DNA). High-speed and high-resolution sample separation can be attained by the capillary electrophoresis device which allows high voltage electrophoresis.

Japanese Patent Application Laid-Open No. 2003-344356 discloses the method of determining the current path state. Specifically, the voltage lower than the voltage set upon electrophoresis of the sample is applied to the current path which contains phoresis medium prior to the sample electrophoresis. The current flowing through the current path is detected, based on which the current path state is determined. The method makes it possible to avoid and lessen disadvantages caused by abnormality in the current path.

CITATION LIST

Patent Literature

Patent Literature 1: Japanese Unexamined Patent Application Publication No. 2003-344356

SUMMARY OF INVENTION

Technical Problem

In the method as disclosed in Patent Literature 1, the current path state is confirmed prior to the electrophoresis based only on abnormality detection upon rise in voltage without considering change in the state of the foreign substance such as a bubble.

In light of the above-described problem, an object of the present invention is to improve accuracy of abnormality detection.

Solution to Problem

The present invention provides the electrophoresis device which includes a flow passage with which a phoresis medium is filled, a first electrode disposed at a cathode side of the flow passage, a second electrode disposed at an anode side of the flow passage, a power supply for applying voltage across the first electrode and the second electrode, a pump for feeding the phoresis medium to the flow passage, and a control section. The control section executes control operations relating to an analysis workflow including a filling step of filling the flow passage with the phoresis medium, an electrophoresis step of executing electrophoresis of a sample, and an abnormality detection step of applying voltage to the first electrode and the second electrode prior to the sample electrophoresis to determine a state of a current path which contains the phoresis medium filled in the flow passage based on a value of current flowing through the current path. The control section applies voltage to the current path for 20 seconds or longer in the abnormality detection step.

Advantageous Effects of Invention

The electrophoresis device according to the present invention allows enhancement in accuracy of abnormality detection.

BRIEF DESCRIPTION OF DRAWINGS

FIG. 7 is an analysis workflow chart according to the second embodiment.

DESCRIPTION OF EMBODIMENTS

First Embodiment

Figure 1:
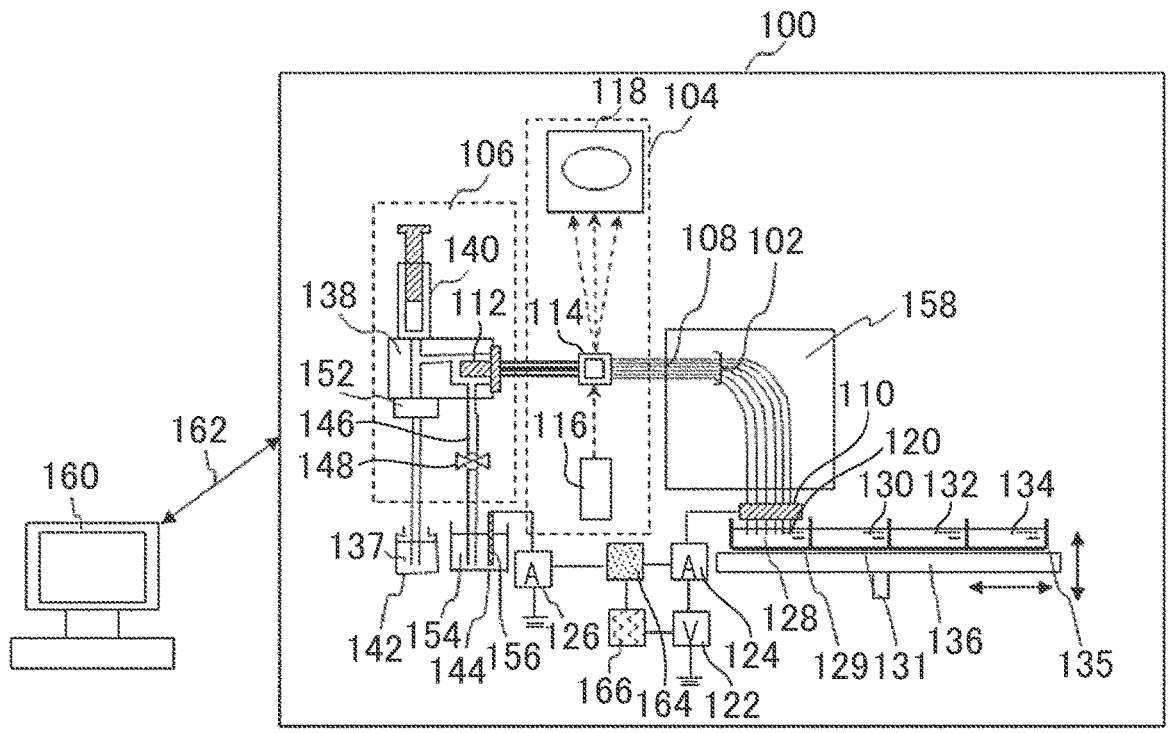
FIG. 1 schematically illustrates an electrophoresis device according to a first embodiment.

FIG. 1 schematically illustrates an electrophoresis device according to the embodiment. An electrophoresis device 100 includes a capillary array 102, an irradiation detection unit 104 for optically detecting a sample separated by electrophoresis, and a pump unit 106 for feeding a phoresis medium.

The capillary array 102 includes one or more capillaries 108, a load header 110, and a capillary head 112.

The capillary 108 is made of a glass tube with an internal diameter ranging from several tens to several hundreds µm, and an external diameter of several hundreds µm. The surface of the capillary 108 is coated with polyimide resin for improving strength. A detection position 114 of the capillary 108, at which the irradiation detection unit 104 reads sample information is not coated with polyimide resin so that the inner light emission is leaked outside. The irradiation detection unit 104 includes a light source 116 and an optical detector 118. The sample placed at the detection position 114 is irradiated with excitation light from the light source 116 so that light with sample-dependent wavelength is emitted. The emitted light is detected by the optical detector 118.

The load header 110 is disposed at a cathode side of the capillary 108. A hollow electrode 120 is integrally attached to the load header 110. A cathode-side end of the capillary 108 passes through the hollow electrode 120, and fixed while protruding therefrom. The hollow electrode 120 is conductive with a high voltage power supply 122, and serves as a cathode electrode when applying voltage for electrophoresis and sample introduction. The electrophoresis device 100 is provided with a first ammeter 124 and a second ammeter 126, each of which detects the current in the current path upon voltage application by the high voltage power supply 122. A triaxially movable transfer machine 136 transfers a cathode buffer container 129 which contains buffer 128, a cleaning container 131 which contains pure water 130, a waste liquid container 132, and a sample container 135 which stores sample-containing solution 134 to the cathode-side end of the capillary 108 as needed.

The capillary head 112 is a member detachably attached to the pump unit 106 under pressure-resisting air-tight state. In the case of multiple capillaries 108, the capillary head 112 serves to bundle anode-side ends of the capillaries into one. A phoresis medium 137 is filled into the capillary 108 by the pump unit 106. The phoresis medium 137 makes the phoresis speed of the sample different upon electrophoresis.

The pump unit 106 is mainly composed of a block 138 having a flow passage, and a pump 140. The block 138 serves as a connection part for communicating the capillary array 102, a phoresis medium container 142 which stores the phoresis medium 137, and an anode buffer container 144 with one another, and includes a flow passage for communication among the capillary array 102, the phoresis medium container 142, and the anode buffer container 144. The block 138 is connected to a connection pipe 146 for connection between the anode buffer container 144 and the block 138. The connection pipe 146 is provided with a valve 148. While the valve 148 is opened, the pump 140 is operated to feed the phoresis medium 137 contained in the phoresis medium container 142 toward the anode buffer container 144 via the flow passage formed in the block 138 and the connection pipe 146. As a result, the flow passage in the block 138 is filled with the phoresis medium 137. While the valve 148 is closed, the phoresis medium 137 is fed to the capillary array 102 to allow the inside of the capillary 108 to be filled with the phoresis medium 137. A check valve 152 is provided between the block 138 and the phoresis medium container 142 to prevent reverse flow of the phoresis medium 137 aspirated from the phoresis medium container 142. The connection pipe 146 and an electrode (GND) 156 are inserted into the anode buffer container 144 to be immersed in a buffer 154 in the anode buffer container 144. Upon voltage application in the state where the connection pipe 146 is not immersed in the buffer 154, the risk of discharging may occur. Preferably, the liquid level of the buffer 154 contained in the anode buffer container 144 is substantially the same as the liquid level of the buffer 128 contained in the cathode buffer container 129 for the purpose of preventing flow of the buffer 154 (128) into the capillary 108, which may be caused by the pressure difference owing to the liquid level difference. In this embodiment, the phoresis medium 137 is fed by operating the pump 140. However, the phoresis medium 137 can be manually fed by the user into the flow passage using syringe or the like.

The electrophoresis device 100 includes a thermostatic bath 158 which keeps the temperature of the capillary array 102 constant during electrophoresis of the sample. The capillary array 102 is disposed in the thermostatic bath 158. The electrophoresis device 100 is used while being connected to a computer 160 via a communication cable 162 or the like. Specifically, although not shown in detail in FIG. 1, the computer 160 is connected to a microcomputer 164 of the electrophoresis device 100. The computer 160 controls operations and functions of the electrophoresis device 100 for interchange of data detected by the electrophoresis device 100. In the embodiment, a detailed explanation will be made assuming that the control section is composed of the computer 160 and the microcomputer 164. However, the single control section may be configured to serve as both the computer 160 and the microcomputer 164.

Figure 2:
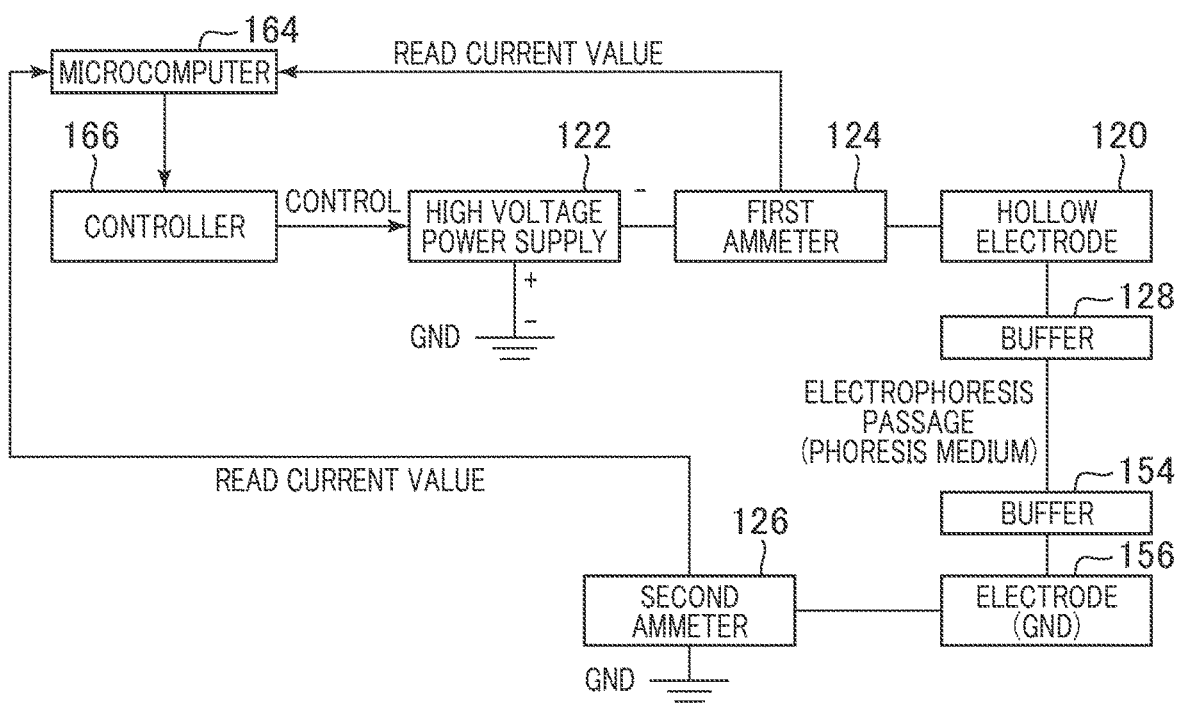
FIG. 2 is a high voltage power supply circuit diagram indicating a voltage control mechanism of the electrophoresis device.

FIG. 2 is a high voltage power supply circuit diagram indicating a voltage control mechanism of the device. Hereinafter, the voltage control mechanism will be described referring to FIG. 2.

The voltage control mechanism includes the microcomputer 164, a controller 166, a high voltage power supply 122, the first ammeter 124, and the second ammeter 126. Under the control executed by the controller 166, the high voltage power supply 122 outputs voltage to be applied to the current path. In this case, the current path is constituted by the hollow electrode 120, the buffer 128 filled in the cathode buffer container 129, the electrophoresis passage, the buffer 154 filled in the anode buffer container 144, and the electrode (GND) 156. The electrophoresis passage is constituted by the phoresis medium 137 filled in the capillary 108, the flow passage formed in the block 138, and the connection pipe 146 (see FIG. 1).

The high voltage power supply 122 is conductive with the hollow electrode 120 via the first ammeter 124, and with the electrode (GND) 156 via the second ammeter 126. The second ammeter 126 is connected to the microcomputer 164. As the high voltage power supply 122 applies voltage, an electric field is generated between the hollow electrode 120 and the electrode (GND) 156. The electric field moves the negatively charged sample from the cathode side to the anode side of the capillary 108. The first ammeter 124 detects current flowing from the high voltage power supply 122 to the hollow electrode 120, and transmits the detected current value to the microcomputer 164. The second ammeter 126 detects current flowing from the electrode (GND) 156 to GND, and transmits the detected current value to the microcomputer 164. In abnormality detection to be described later, the value of the second ammeter 126 is used as the value of current flowing through the current path. The medium with relatively higher resistance than that of metal, for example, the buffer 154 (168) and the phoresis medium 137 intervenes between the first ammeter 124 and the second ammeter 126. There are many connection parts such as the block 138 and the capillary array 102 between the first ammeter 124 and the second ammeter 126. The part between the first ammeter 124 and the second ammeter 126 is likely to cause noise in the current value to be measured. On the contrary, the numerical value of the second ammeter 126 is unlikely to contain noise. The second ammeter 126 detects the net value of current flowing through the electrophoresis passage.

The microcomputer 164 reads current values from the first ammeter 124 and the second ammeter 126, and executes an arithmetic operation for transmitting a command to the controller 166 so that the high voltage power supply 122 is controlled to be brought into various states, for example, a high voltage application state, a low voltage application state, a voltage cut-off state, and the like.

In the analysis workflow of the present invention, which will be described later in detail, prior to the sample electrophoresis, voltage is applied across the hollow electrode 120 and the electrode (GND) 156. The current flowing through the current path is compared with the threshold value to execute abnormality detection for determining the current path state. When applying voltage to the current path in the presence of the foreign substance in the electrophoresis passage, the foreign substance serves as the resistance to interfere with the current flow. The resultant current value becomes smaller than the one in the absence of the foreign substance. It is therefore possible to determine the current path state by comparison between the current value and the threshold value. In Patent Literature 1, the current rise time is only focused, considering only detection of the foreign substance which can be detected upon current rise. However, the minute bubble which cannot be detected as the foreign substance upon the current rise time may be expanded in Joule heat generated by the voltage application after the abnormality detection step. In this case, the electrophoresis passage is blocked to cause discharging. After execution of the abnormality detection step, the voltage higher than the one in the abnormality detection step is applied. Accordingly, voltage application subsequent to the abnormality detection step is more likely to cause damage to the pump unit 106 or the capillary 108 than voltage application in the abnormality detection step. It is therefore preferable to detect the foreign substance in the abnormality detection step. If the foreign substance that has not been detected in the abnormality detection step is detected after execution of the abnormality detection step such as the electrophoresis, the analysis operation is interrupted. Upon delay in detection of the foreign substance, the step-back operation is increased correspondingly, resulting in prolonged time required for the analysis.

Figure 3:
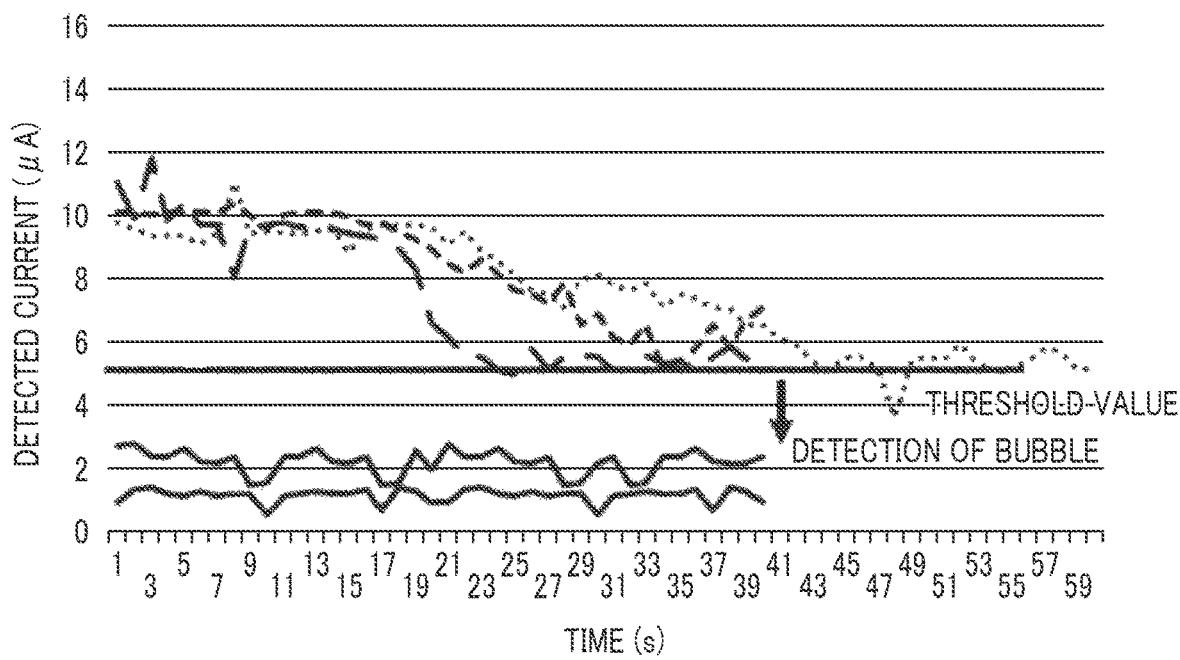
FIG. 3 represents variation in a current value in accordance with application time.

FIG. 3 is a graph indicating variation in the current value to the voltage application time upon application of voltage of 2 kV across the hollow electrode 120 and the electrode (GND) 156 in the bubble-mixed state. In this case, current value data are measured in the electrophoresis passage originally in the bubble-mixed state. As described above, if the current value is smaller than the predetermined threshold value, it is determined that abnormality exists. The data indicated by the solid line represent that the bubble has been detected at the current rise time (for example, 3 seconds after current application), and those indicated by the dotted line represent that the bubble has not been detected at the current rise time. In either case, the bubble has been mixed. The dotted line data indicate that the bubble cannot be detected upon current rise. As voltage is applied continuously, the current value is largely decreased as a result of change in the state of the foreign substance such as expansion of the bubble. Finally, the current value exceeds the threshold value, resulting in detection of the foreign substance. The bubble detection process as disclosed in Patent Literature 1 allows abnormality detection only in the case of solid line data. Referring to FIG. 3, it can be confirmed that the detected current value starts decreasing sharply after 17 seconds from the voltage application. Accordingly, it is preferable to apply voltage in the abnormality detection step for at least 20 seconds or longer at which the current value largely varies (for example, amount of variation in the detected current value becomes 1 uA). If the application time is excessively prolonged, the risk of discharging or the like may occur. It is therefore preferable to set the application time to 60 seconds or shorter to avoid the risk of discharging even in the abnormal state. The prolonged application time improves performance of detecting the foreign substance. However, the excessively prolonged application time may extend the time for executing the analysis workflow. Therefore, it is preferable to set the application time from 20 seconds to 60 seconds inclusive.

Figure 4:
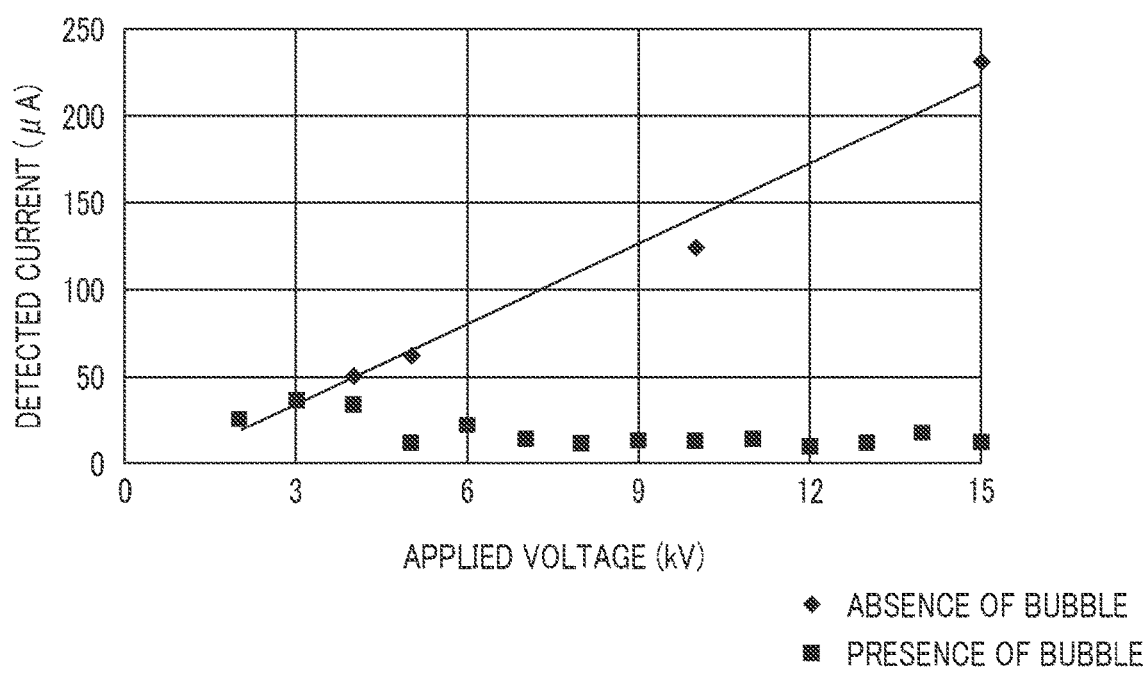
FIG. 4 represents variation in a current value in accordance with applied voltage.

The graph of FIG. 4 represents the relationship between the applied voltage and the detected current. A horizontal axis indicates the voltage applied to the hollow electrode 120 and the electrode (GND) 156, and a vertical axis indicates the value of current flowing through the current path, which has been acquired by the second ammeter 126. In the absence of foreign substance, the applied voltage and the detected current value form a substantially linear relationship. If the applied voltage is low, the current value is small even in the absence of the foreign substance, and the current value difference in the state between presence and absence of the foreign substance is small. Referring to the graph of FIG. 4, if the applied voltage is 3 kV or lower, it is confirmed that the detected current values in the absence and presence of bubbles substantially overlap with each other. Under the low applied voltage condition, it is difficult to set the optimum threshold value, and accordingly, it is difficult to determine whether or not abnormality has occurred. Meanwhile, if the applied voltage is high, the current value to be detected significantly differs depending on absence or presence of the foreign substance. This allows determination as to absence or presence of abnormality easily. The graph shows that, in the presence of bubble, the current value is decreased at the applied voltage from 4 kV to 5 kV. That is, in the case of high applied voltage, the bubble is likely to expand, and the detected current is further decreased. For that reason, the higher applied voltage allows highly accurate detection of foreign substance. It is therefore preferable to detect abnormality by applying voltage of 4 kV or higher. If the applied voltage is made excessively high, the discharging risk may occur. It is preferable to apply voltage ranging from approximately 4 kV to 6 kV upon abnormality detection so as to avoid discharging even in the abnormal state where the bubble or the foreign substance has been mixed in the flow passage.

As described above, abnormality detection is executed by applying voltage of 4 kV or higher for 20 seconds or longer to allow highly accurate detection of the foreign substance. It is possible to reduce frequency of stopping the analysis operation after the abnormality detection step. It is also possible to lessen risks such as damage to the pump unit 106 or the capillary 108, and discharging.

An explanation will be made with respect to preparation to be performed before starting the analysis workflow. An operator places the cathode buffer container 129, the cleaning container 131, the anode buffer container 144, the phoresis medium container 142, the capillary array 102, and the sample container 135 in the device. The cathode buffer container 129, the cleaning container 131, the anode buffer container 144, the phoresis medium container 142, the capillary array 102, and the sample container 135 are all replaceable members. Any of those members will be replaced at a prescribed timing. The electrophoresis passage has to be filled with the phoresis medium 137 before starting the analysis workflow. Therefore, upon replacement of the capillary array 102 and the phoresis medium container 142, the capillary 108 and the flow passage formed in the block 138 are filled with the phoresis medium 137 using the pump unit 106 before executing the analysis workflow.

Figure 5:
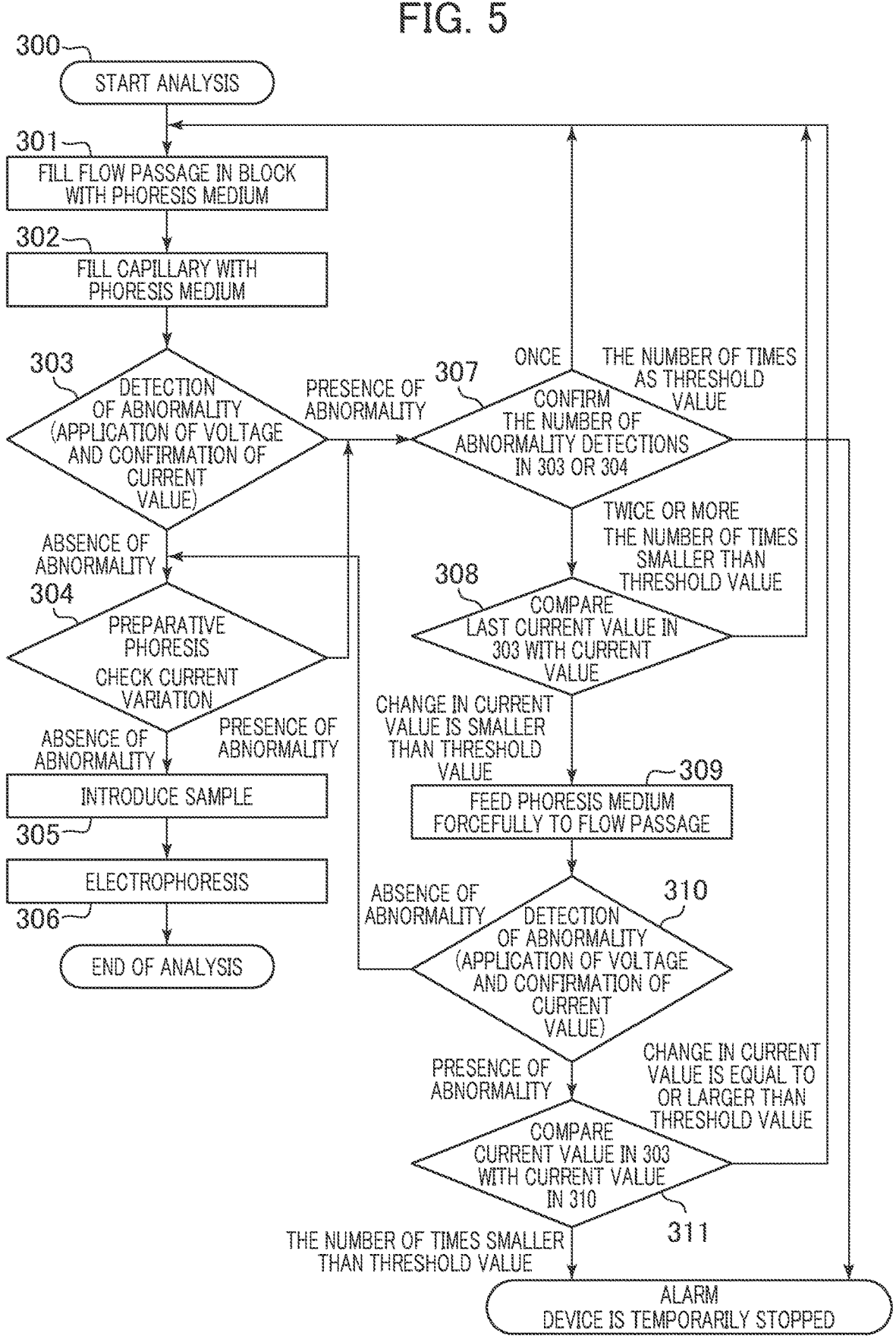
FIG. 5 is an analysis workflow chart according to the first embodiment.

The analysis workflow will be described referring to FIG. 5. The analysis workflow is executed upon reception of a start command from the computer 160 (300). Upon execution of the analysis workflow, the pump 140 is operated to fill the flow passage formed in the block 138 and the connection pipe 146 with the phoresis medium 137 (301). Then the capillary array 102 is filled with the phoresis medium 137 (302). The abnormality detection is executed for confirming whether or not abnormality exists in the current path (303).

The abnormality detection is executed by applying the voltage lower than the one used for the electrophoresis as described above, and measuring the value of current flowing through the current path. The measured current value is compared with the predetermined threshold value so that existence or non-existence of abnormality is confirmed. This makes it possible to preliminarily detect abnormality to suppress detection of damage to the pump unit 106 or the capillary 108 owing to electrophoresis in the abnormal state, and detection of abnormality after execution of the abnormality detection. It is preferable to apply voltage of 4 kV or higher for 20 seconds or longer.

If non-existence of abnormality is determined in the abnormality detection, a preparative phoresis is executed (304). The preparative phoresis is executed for making the condition of the phoresis medium 137 in the capillary 108 adaptable to the electrophoresis. In the preparative phoresis, the voltage of several to tens several kV is applied for several tens of minutes. During the preparative phoresis, current is measured for detecting abnormality. If abnormality is not detected in the preparative phoresis, the sample is introduced into the capillary 108 (305). The transfer machine 136 transfers the sample container 135 so that the cathode-side end of the capillary 108 and the hollow electrode 120 are immersed in solution 134 which contains the sample. Then the high voltage power supply 122 applies voltage across the hollow electrode 120 and the electrode (GND) 156 so that the sample is introduced into the capillary 108. Thereafter, the transfer machine 136 transfers the cathode buffer container 129 so that the cathode-side end of the capillary 108 and the hollow electrode 120 are immersed in the buffer 128 for starting the electrophoresis (306). As the high voltage power supply 109 applies voltage across the hollow electrode 120 and the electrode (GND) 156, the sample as the detection object is separated while it is moving in the capillary 108. The sample is detected by the irradiation detection unit 104 while passing the detection position 114 of the capillary 108.

The abnormality detected in the abnormality detection in step 303, or in the preparative phoresis in step 304 has to be eliminated. The detected abnormality is assumed to be caused by abnormality in the current path, specifically, insufficiency of the buffer 128 (154), residual bubble or mixture of foreign substance in the electrophoresis passage, damage to the capillary 108, and the like. Conventionally, upon confirmation of abnormality, an error is immediately notified to call the operator's attention to deal with the error. The operator visually confirms the abnormal state so that a necessary measure is taken in accordance with the cause of the confirmed abnormality. The foreign substance is removed when it is confirmed in the flow passage. However, the foreign substance cannot be easily found out in the flow passage. It is therefore difficult to determine presence or absence of the foreign substance, resulting in much labor. Especially, a very small foreign substance cannot be visually confirmed. In addition to the foregoing problem, the visual confirmation by the operator for determining presence or absence of foreign substance causes another problem of making detection of the foreign substance variable depending on the individual operator. If the electrophoresis is continuously executed while having the foreign substance kept mixed in the electrophoresis passage, such foreign substance serves as the resistance to cause risks of deterioration in analysis accuracy owing to conduction failure, and damage to the component owing to partial discharging. In the analysis workflow according to the embodiment, upon detection of abnormality, the foreign substance is automatically removed. This makes it possible to reduce frequency of sending requests to the operator to deal with the abnormality, resulting in improved operability. Upon detection of abnormality, the predetermined flow is automatically executed. This makes it possible to suppress variation in abnormality detection depending on the individual operator.

In the analysis workflow according to the embodiment, upon detection of abnormality, the number of abnormal detections executed in step 303 or 304 is recorded in the control section, for example, the computer 160 or the microcomputer 164 (307). In the case of the first abnormality detection in step 303 or 304, the process returns to step 301 where the flow passage in the block 138 and the capillary 108 are re-filled with the phoresis medium 137 for executing abnormality detection in step 303. In the case of the second abnormality detection onward, and the smaller number of abnormality detections than the threshold value, comparison is made between the current values before and after re-filling the phoresis medium 137 measured in step 303 (308). Expansion of the bubble or movement of the foreign substance may vary the current value to be measured. The current values measured in step 303 between before and after re-filling the phoresis medium 137 are compared to confirm change in the foreign substance state. If variation in the current value measured in step 303 between before and after re-filling the phoresis medium 137 is larger than the predetermined threshold value, it is determined that the abnormality state has been changed. In this case, as re-filling of the phoresis medium 137 has changed the abnormality state, it is highly likely to release the abnormal state by filling the phoresis medium 137. Accordingly, the process returns to step 301 where the phoresis medium 137 is re-filled to attempt to remove the foreign substance. In step 308, if variation in the current value between before and after re-filling the phoresis medium 137 is smaller than the threshold value, it is considered that the abnormal state has not been changed. As the foreign substance clogged in the electrophoresis passage possibly has difficulty in moving, the phoresis medium 137 is forcefully fed by increasing the feeding pressure or accelerating feeding speed (309). Specifically, the magnitude of current for driving the pump 140 is made greater to increase the force to extrude the phoresis medium 137. If the pump 140 is driven by the motor, the rotation speed of the motor is raised to feed the phoresis medium 137 at further accelerated feeding speed. Similar to the abnormality detection in step 303, the abnormality detection is executed by measuring the current value (310). If abnormality is not detected, it is determined that the foreign substance has been removed. The process then proceeds to step 304 where the preparative phoresis is executed. If abnormality is detected in the abnormality detection process in step 310, the current value previously measured in step 303 is compared with the current value measured in step 310 (311). If variation in the current value is smaller than the threshold value, it is considered that the abnormality state has not been changed. It is highly likely that the error has occurred owing to the cause other than the foreign substance in the electrophoresis passage. As the error cause other than the foreign substance is widely ranged, including insufficiency of the buffer 128 (154) and damage to the capillary 108, the operator is notified of the error, and demanded to deal with the error (313). If variation in the current value exceeds the threshold value, it is considered that the foreign substance has moved. The process returns to step 301 where the phoresis medium 137 is re-filled.

The number of abnormality detections is recorded in step 307, and the threshold value corresponding to the number of abnormality detections in step 303 or 304 is set. If the number of abnormality detections recorded in step 307 exceeds the threshold value, an error message is displayed so that the device is stopped (313). The threshold value contributes to suppression of more consumption of the phoresis medium 137 than necessary. Upon display of the error, it is possible to notify the high possibility of the cause of abnormality, which is other than the foreign substance by removing the foreign substances by the predetermined number of times. In this embodiment, the threshold value is set corresponding to the number of abnormality detections in step 303 or 304. The similar analysis workflow can be executed by recording the number of times of filling steps executed in steps 301 to 302, and setting the threshold value corresponding to the number of times.

Second Embodiment

An electrophoresis device 600 according to the present embodiment includes a third electrode 602 for confirmation of a position at which abnormality has been generated. Other structures of the device besides the third electrode 602 are the same as those of the first embodiment.

An explanation will be made with respect to the electrophoresis device 600 provided with the third electrode 602 according to the embodiment. In this embodiment, among flow passages formed in the block 138, a first flow passage 604 communicates the phoresis medium container 142 with the capillary 108, and a second flow passage 606 communicates the anode buffer container 144 that stores the electrode (GND) 156 with the capillary 108. A capillary connection part 608 is connected to the capillary head 112, at which the first flow passage 604 and the second flow passage intersect.

The electrophoresis device 600 of the embodiment includes the third electrode 602 newly added to the first flow passage 604. Upon abnormality detection in the first embodiment, the determination on existence or non-existence of abnormality is made only from the current value between the hollow electrode 120 and the electrode (GND) 156. Upon abnormality detection in this embodiment, the current path state is determined based on measurement current values across the hollow electrode 120 and the electrode (GND) 156, and across the hollow electrode 120 and the third electrode 602.

The abnormality detection according to the embodiment will be described on the assumption that the value of current across the hollow electrode 120 and the electrode (GND) 156 is designated as a first current value, and the value of current across the hollow electrode 120 and the third electrode 600 is designated as a second current value.

In the embodiment, the abnormality detection may take four patterns, that is, no error detected from the first and the second current values (case 1), abnormality detected only from the first current value (case 2), abnormality detected only from the second current value (case 3), and abnormality detected from the first and the second current values (case 4). The case 1 is an only pattern based on which non-existence of abnormality is determined.

Figure 6:
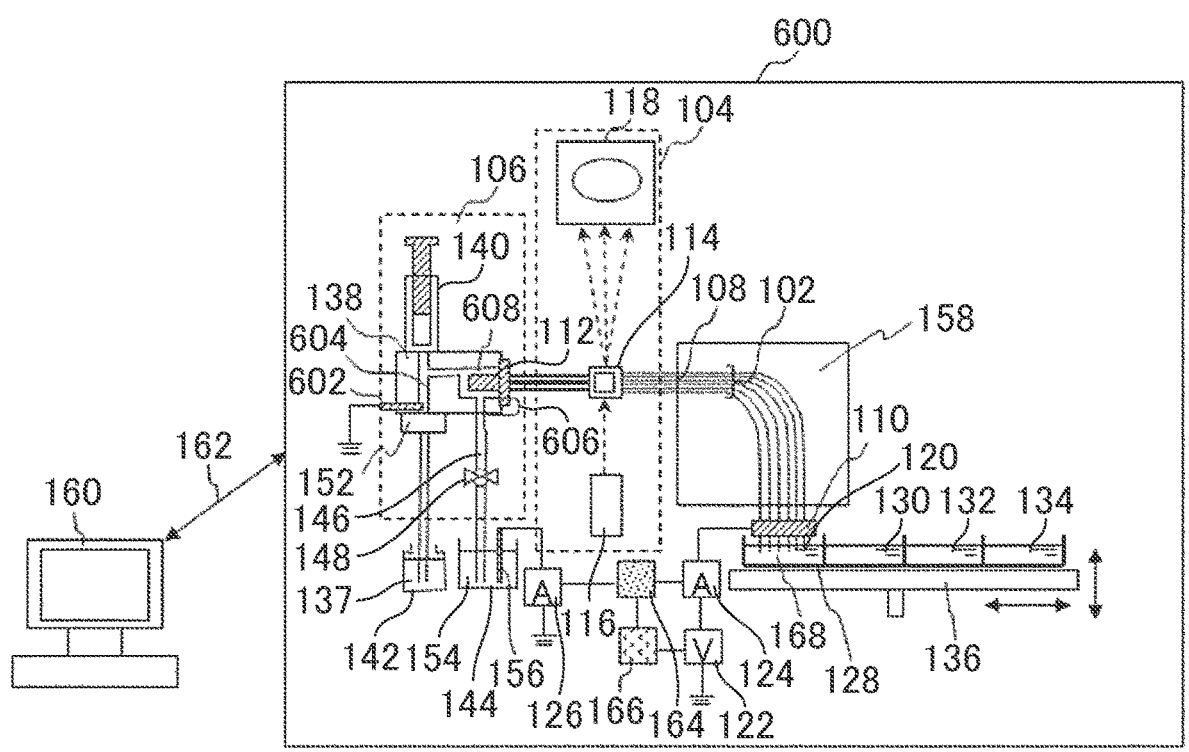
FIG. 6 schematically illustrates an electrophoresis device according to a third embodiment, which is provided with a third electrode.

The error detected from the first current value is caused by the foreign substance in the capillary 108, the capillary connection part 608, the second flow passage 606, or the connection pipe 116, or by the abnormality state owing to the cause other than the foreign substance. The error detected from the second current value is caused by the foreign substance in the capillary 108, the capillary connection part 608, or the first flow passage 604, or by the abnormality state owing to the cause other than the foreign substance. If the abnormality is determined based on any one of the first current value or the second current value, the cause of the abnormality is detectable based only on one of those values. In other words, if abnormality is determined only from the first current value (case 2), the foreign substance either in the second flow passage 606 or the connection pipe 146 may be the cause of the error. If abnormality is determined only from the second current value (case 3), the foreign substance in the first flow passage 604 may be the cause of the error. In the first embodiment, if the abnormality is detected, the block 138 and the capillary 108 are re-filled with the phoresis medium 137. Based on the case 2 or case 3 of the embodiment, it can be determined that the foreign substance in the block 138 or in the connection pipe 146 is the cause of abnormality. Accordingly, the phoresis medium 137 is fed into the flow passage of the block 138 to remove the foreign substance. This makes it possible to reduce consumption of the phoresis medium 137 used for removing the foreign substance. Preferably, the third electrode 602 is attached to the connection part between the phoresis medium container 142 and the block 138 to attain detection of abnormality in the entire first flow passage 604. Referring to FIG. 6, the third electrode 602 is attached to the block 138. However, it is also possible to insert the third electrode into the phoresis medium container 142.

Referring to FIG. 7, an explanation will be made with respect to a part of the analysis workflow, which is different from that of the first embodiment. The part of the workflow, which is different from that of the first embodiment is the flow of re-filling the phoresis medium 137. As the remaining part of the workflow of this embodiment is the same as the one according to the first embodiment, similar explanations will be omitted. In steps 303 and 310, abnormality is detected through determination as to existence of abnormality based on the first and the second current values. If abnormality is detected based on at least one of the first and the second current values, abnormality is determined. If non-existence of abnormality is determined based on the first and the second current values (case 1), it is determined that there is no abnormality. Referring to FIG. 7, steps 307 to 311 are omitted for easy viewability as they are the same as those in the chart of the first embodiment shown in FIG. 5.

In the embodiment, if the phoresis medium 137 is to be re-filled (700) based on a result of the process executed from steps 307 to 311, the abnormality detection result is confirmed (701). In the embodiment, the flow differs depending on the abnormality detection result.

If abnormality is detected from any one of the first and the second current values in the case 2 or 3, it can be determined that the abnormality cause is the foreign substance either in the second flow passage 606 or the connection pipe 146, or the foreign substance in the first flow passage 604. Accordingly, the flow passage formed in the block 138 is filled with the phoresis medium 137 (702). The flow passage in the block 138 is filled with the phoresis medium 137 by executing the following process. The phoresis medium 137 in the phoresis medium container 142 is fed to the anode buffer container 144 via the first flow passage 604, the capillary connection part 608, the second flow passage 606, and the connection pipe 146 so that the foreign substance is discharged into the anode buffer container 144. If abnormality is detected from the first current value in the case 2, the foreign substance in the second flow passage 606 or the connection pipe 146 is the cause of abnormality. The foreign substance is positioned near the anode buffer container 144 as the destination into which the foreign substance is discharged. In this case, as the phoresis medium 137 can be fed by the amount sufficient to fill the second flow passage 606 and the connection pipe 146, the phoresis medium 137 by the amount smaller than the filling amount of the phoresis medium used in steps 301 and 702 is fed to the flow passage in the block 138 (703). The amount of the phoresis medium 137 to be fed is adjusted in the case 2 or 3 to allow further reduction in consumption of the phoresis medium 137.

If abnormality is detected from the first and the second current values in the case 4, the cause of the abnormality may be variously ranged, for example, the foreign substance in the capillary 108, the first flow passage 604, and either the second flow passage 606 or the connection pipe 146. In the case 4, the process returns to step 302 where the flow passage in the block 138 and the capillary 108 are re-filled with the phoresis medium 137 in the similar manner to the first embodiment.

As described above, the system for suppressing consumption of the phoresis medium is established to cope with abnormality as a result of confirmation of the current path prior to the electrophoresis by operating the electrophoresis device. The system is implemented by using the system for removing the mixed foreign substance, restricting the number of times of removing the foreign substance, and changing the process of removing the foreign substance in accordance with the position at which the foreign substance has been mixed.

The abnormality detection after feeding the phoresis medium according to the analysis workflow has been described in the first and the second embodiments. It is also possible to execute the above-described abnormality detection step after filling the phoresis medium 137 prior to execution of the analysis workflow.

In the abnormality detection step according to the first and the second embodiments, the current path state is determined by comparison between the current value and the threshold value. It is also possible to determine the abnormal state based on an inclination of the current value.

LIST OF REFERENCE SIGNS

100: electrophoresis device
102: capillary array
104: irradiation detection unit
106: pump unit
108: capillary
110: load header
112: capillary head
114: detection position
116: light source
118: optical detector
120: hollow electrode
122: high voltage power supply
124: first ammeter
126: second ammeter,
128: buffer
129: cathode buffer container
130: pure water
131: cleaning container
132: waste liquid container
134: sample-containing solution
135: sample container
136: transfer machine
137: phoresis medium,
138: block
140: pump
142: phoresis medium container
144: anode buffer container
146: connection pipe
148: valve
152: check valve
154: buffer
156: electrode (GND)
158: thermostatic bath
160: computer
162: communication cable
164: microcomputer
166: controller
168: buffer
600: electrophoresis device
602: third electrode
604: first flow passage
606: second flow passage
608: capillary connection part

The invention claimed is:

1. An electrophoresis device comprising:
a flow passage with which a phoresis medium is filled;
a first electrode disposed at a cathode side of the flow passage;
a second electrode disposed at an anode side of the flow passage, wherein:
the flow passage includes a capillary and a block, with which a phoresis medium is filled;
the block includes a first flow passage for communication between the capillary and a phoresis medium container, and a second flow passage for communication between a buffer container which stores the second electrode and the capillary, and the first flow passage or the phoresis medium container includes a third electrode for abnormality confirmation;
a power supply for applying voltage across the first electrode and the second electrode, and the first electrode and the third electrode;
a pump for feeding the phoresis medium to the flow passage; and
a control section, wherein:
the control section executes control operations relating to an analysis workflow including a filling step of filling the flow passage with the phoresis medium, an electrophoresis step of executing electrophoresis of a sample, and an abnormality detection step of determining, based on a first current value and a second current value, a state of a current path which contains the phoresis medium filled in the flow passage, by applying voltage to the first electrode and the second electrode to obtain the first current value, and the first electrode and the third electrode to obtain the second current value, prior to the sample electrophoresis; and
the control section applies voltage to the current path for 20 seconds or longer in the abnormality detection step.

2. The electrophoresis device according to claim 1, wherein:
when abnormality is determined from the first current value and the second current value, the capillary and the block are filled with the phoresis medium; and
when abnormality is determined from either the first current value or the second current value, the block is filled with the phoresis medium.

3. The electrophoresis device according to claim 2, wherein: when abnormality is detected from the first current value, and abnormality is not detected from the second current value, an amount of the phoresis medium to be fed is smaller than that of the phoresis medium to be fed when abnormality is detected from the second current value, and abnormality is not detected from the first current value.

4. The electrophoresis device according to claim 1, wherein the control section applies voltage of 4 kV or higher in the abnormality detection step.

5. The electrophoresis device according to claim 1, wherein the control section executes the filling step again upon detection of abnormality detected in the abnormality detection step.

6. The electrophoresis device according to claim 5, wherein:
the control section records the number of abnormality detections executed in the abnormality detection step or the number of times of the executed filling steps; and
in the analysis workflow, in the case of the second abnormality detection, it is determined whether the filling step is to be executed again based on the current value derived from the first abnormality detection, and the current value derived from the second abnormality detection.

7. An electrophoresis device comprising:
a flow passage with which a phoresis medium is filled;
a first electrode disposed at a cathode side of the flow passage;
a second electrode disposed at an anode side of the flow passage;
a power supply for applying voltage across the first electrode and the second electrode;
a pump for feeding the phoresis medium to the flow passage; and
a control section, wherein:
the control section executes control operations relating to an analysis workflow including a filling step of filling the flow passage with the phoresis medium, an electrophoresis step of executing electrophoresis of a sample, and an abnormality detection step of applying voltage to the first electrode and the second electrode prior to the sample electrophoresis to determine a state of a current path which contains the phoresis medium filled in the flow passage based on a value of current flowing through the current path;
the control section applies voltage to the current path for 20 seconds or longer in the abnormality detection step;
the control section executes the filling step again upon detection of abnormality detected in the abnormality detection step;
the control section records the number of abnormality detections executed in the abnormality detection step or the number of times of the executed filling steps;
in the analysis workflow, in the case of the second abnormality detection, it is determined whether the filling step is to be executed again based on the current value derived from the first abnormality detection, and the current value derived from the second abnormality detection; and
when it is determined that an amount of variation in the current value is small based on comparison of a threshold value with a difference between the current value derived from the first abnormality detection and the current value derived from the second abnormality detection, the phoresis medium is fed at a higher speed or under a higher pressure than the speed or the pressure for feeding the phoresis medium in the filling step.

8. The electrophoresis device according to claim 7, wherein:
the current value is measured after feeding the phoresis medium at the higher speed or under the higher pressure, and compared with the current value derived from the second abnormality detection to determine whether the filling step is to be executed again; and
if the filling step is not executed, an error is notified.

9. The electrophoresis device according to claim 5, wherein the recorded number of times reaches a predetermined number of times, the error is notified.

10. The electrophoresis device according to claim 1, wherein in the abnormality detection step, the value of current flowing through the current path is compared with a predetermined threshold value to determine the current path state.

* * * * *